(12) United States Patent
Li

(10) Patent No.: US 8,934,517 B1
(45) Date of Patent: Jan. 13, 2015

(54) IMPULSE RADIO ULTRA WIDE BANDWIDTH DATA TRANSMISSION ENCODING/DECODING METHOD AND ENCODING/DECODING MODULE

(71) Applicant: Shanghai IC R&D Center Co., Ltd., Shanghai (CN)

(72) Inventor: Chen Li, Shanghai (CN)

(73) Assignee: Shanghai IC R&D Center Co., Ltd, Shanghai (CN)

( * ) Notice: Subject to any disclaimer, the term of this patent is extended or adjusted under 35 U.S.C. 154(b) by 0 days.

(21) Appl. No.: 14/369,194

(22) PCT Filed: Nov. 21, 2012

(86) PCT No.: PCT/CN2012/084955
§ 371 (c)(1),
(2) Date: Jun. 27, 2014

(87) PCT Pub. No.: WO2014/043991
PCT Pub. Date: Mar. 27, 2014

(30) Foreign Application Priority Data

Sep. 20, 2012 (CN) .......................... 2012 1 0353037

(51) Int. Cl.
*H04B 1/00* (2006.01)
*H04B 1/7176* (2011.01)
*H04B 1/69* (2011.01)

(52) U.S. Cl.
CPC ...... *H04B 1/7176* (2013.01); *H04B 2001/6908* (2013.01)
USPC ........... 375/138; 375/146; 375/147; 375/295; 375/316

(58) Field of Classification Search
USPC .......................... 375/138, 146, 147, 295, 316
See application file for complete search history.

(56) References Cited

U.S. PATENT DOCUMENTS

| | | | |
|---|---|---|---|
| 8,605,770 B2 * | 12/2013 | Roh et al. ....................... | 375/138 |
| 2008/0247442 A1 * | 10/2008 | Orlik et al. ..................... | 375/138 |
| 2010/0172393 A1 * | 7/2010 | Jia et al. ........................ | 375/132 |

* cited by examiner

*Primary Examiner* — Ted Wang

(57) ABSTRACT

The present invention provides an IR-UWB data transmission encoding/decoding method and module. The encoding method comprises: in each unit time period lasting T seconds, receiving an N-bit of binary data of an M-bit binary data stream and generating UWB impulse radio signal having a specific frequency fi, determining and generating an amplitude value Ax of the UWB impulse radio signal having the specific frequency fi according to the remaining M-N bits binary data, and finally transmitting the UWB impulse radio signal having the specific frequency fi and the amplitude value. The decoding method corresponds to the encoding method. According to the present invention, the data transmission rate can be increased by four times compared with the conventional data transmission rate without increasing the circuit complexity, which is useful and attractive to the IR-UWB system.

16 Claims, 5 Drawing Sheets

--Prior Art--

IMPULSE RADIO ULTRA WIDE BANDWIDTH DATA TRANSMISSION ENCODING/DECODING METHOD AND ENCODING/DECODING MODULE

CROSS-REFERENCE TO RELATED APPLICATION

This application claims the priority benefit of International Patent Application Ser. No. PCT/CN2012/084,955, filed Nov. 21, 2012, which is related to and claims the priority benefit of China Patent Application Serial No. 201210353037.3 filed Sep. 20, 2012. The entirety of each of the above-mentioned patent applications is hereby incorporated by reference herein and made a part of this specification.

FIELD OF THE INVENTION

The present invention relates to the field of wireless communication and particularly to an encoding/decoding method and encoding/decoding module for high speed data transmission of high quality image or even video data.

BACKGROUND OF THE INVENTION

With the development and industrialization of the new generation wireless broadband communication technology, handheld multi-media terminals mainly including PDAs (Personal Digital Assistant), multi-media phones and tablets are widely used, expected to become a unified platform for the popularization and application of the information technology which can support variety of information application and develop rapidly in various fields such as industry, agriculture, medical, education, family and personal communication. High speed data transmission is one of the key technologies for fast development and wide application of the handheld multi-media terminals.

In order to ensure effective high quality image data or even video data transmission during the data exchange between the terminals, sufficient data rate is required. However, the improvement of the data rate not only challenges the performance of the whole receiver of the terminal such as sensitivity and noise, but also tests the power consumption of the analog baseband amplifiers and filters. Furthermore, the high data rate also affects the spectrum planning of the system.

Nowadays, impulse radio ultra wide bandwidth (IR-UWB) system is one of an international mainstream transceiver system to realize the new generation wireless broadband communication technology. The ultra wide bandwidth (UWB) system has been clearly defined by the FCC (Federal Communications Commission) as early as February 2002 to operate in the 3.1 to 10.6 GHz frequency range at the power spectral density lower than −41.3 dBm/MHz with a −10 dB fractional bandwidth (absolute bandwidth to center frequency ratio) of more than 20% or a −10 dB absolute bandwidth of more than 500 MHz. Accordingly, the UWB technology uses a remarkably wider band than all the conventional communication technology.

Researchers have proposed a system to achieve the ultra wide bandwidth communication under the UWB framework—an impulse radio ultra wide bandwidth (IR-UWB) system. The core of the IR-UWB concept is that the use of extremely short pulses in the time domain causes a corresponding broad frequency spectrum in the frequency domain. In other words, the extremely short duration impulse radio transferred by the communication system in the time domain, which is a signal of very small duty ratio in a cycle transmitted by the communication system, generates a wide bandwidth signal in the frequency domain through the Fourier transform. When the bandwidth of the generated signal exceeds 500 MHz, the signal becomes a standard UWB signal and the transmission protocol thereof complies with the UWB regulation.

At present, OOK modulation is the most common signal modulation scheme applied in the IR-UWB system. According to the OOK modulation, if there exists an impulse radio signal with a frequency f during a unit time period (such as T seconds), binary data "1" will be transmitted during the unit time period (such as T seconds); and if there exists no signals during the unit time period (such as T seconds), binary data "0" will be transmitted, as shown in FIG. 1. Therefore, only one binary data can be transmitted during a unit time period, which results in a low utilization of time. The time interval T generally ranges from 0.1 us to 10 us and is preferably to be 1 us. Specifically, if the unit time period T is assumed to be 1 us and the impulse radio signal transmitted during the unit time period has only one frequency, the data rate of the whole impulse-radio system will be 1 MHz.

However, how to effectively utilize the IR-UWB system to increase the data transfer rate has become an important topic in the IR-UWB system nowadays. It is noted that although researchers have taken a plurality of measurements including circuit and system design to improve the data rate by 20-30%, the complexity of the circuit greatly arises and the power consumption of the system sharply increases.

SUMMARY OF THE INVENTION

Accordingly, at least one object of this invention is to provide an IR-UWB data transmission encoding/decoding method and encoding/decoding module different from the conventional data transmission encoding/decoding to transmit data stream during a unit time period as much as possible so as to enhance the time utilization.

To achieve the above purpose, the present invention provides an IR-UWB data transmission encoding/decoding method including an encoding method and a decoding method, wherein the encoding method comprises the following steps:

Step S11: during each unit time period lasting T seconds, receiving an N-bit binary data of an M-bit binary data stream and generating a UWB impulse radio signal having a specific frequency fi; wherein M is a positive integer greater than or equal to 2, N is a positive integer greater than or equal to 1, and M is greater than N; the specific frequency fi is selected among a group of frequencies of a local signal from f1 to fj, wherein i and j are positive integers and j equals to $2^N$;

Step S12: determining and generating an amplitude value Ax of the UWB impulse radio signal having the specific frequency of fi according to the remaining M-N bits binary data; wherein x is a positive integer from 1 to y, y equals to $2^{M-N}$; the amplitude value Ax is selected among a group of amplitude values of the local signal from A1 to Ay;

Step S13: transmitting the UWB impulse radio signal having the specific frequency fi and the amplitude value in each unit time period lasting T seconds;

wherein the decoding method corresponds to the encoding method and comprises the following steps:

Step S21: receiving the UWB impulse radio signal having the specific frequency fi and the amplitude value Ax during each unit time period lasting T seconds;

Step S22: restoring the N-bit binary data of the M-bit binary data stream according to the specific frequency fi of the UWB impulse radio signal;

Step S23: restoring the remaining M-N bits binary data of the M-bit binary data stream according to the specific amplitude value Ax of the UWB impulse radio signal so as to form the M-bit binary data stream during each unit time period lasting T seconds.

Preferably, the N-bit binary data is the first N-bit binary data of the M-bit binary data stream. Preferably, the N-bit binary data is the last N-bit binary data of the M-bit binary data stream. Preferably, M is 4 and N is 2; the group of frequencies of the local signal includes f1, f2, f3 and f4; the group of the amplitude values of the local signal includes A1, A2, A3 and A4.

Preferably, the specific frequency of the UWB impulse radio signal is selected to be f1=5.5 GHz, f2=4.9 GHz, f3=4.3 GHz or f4=3.7 GHz.

Preferably, the specific amplitude value of the UWB impulse radio signal is selected to be A1=6 dBm, A2=3 dBm, A3=0 dBm or A4=−3 dBm.

To achieve the above purpose, the present invention also provides an encoding/decoding module for the IR-UWB data transmission. The encoding/decoding module comprises an encoding module and a decoding module.

The encoding module comprises a UWB impulse radio generating sub-module and a transmitting sub-module. The UWB impulse radio generating sub-module comprises a frequency generating unit and an amplitude generating unit. The frequency generating unit generates a UWB impulse radio signal having a specific frequency fi during each unit time period lasting T seconds according to a received N-bit binary data of an M-bit binary data stream; wherein M is a positive integer greater than or equal to 2, N is a positive integer greater than or equal to 1, and M is greater than N; the specific frequency fi is selected among a group of frequencies of a local signal from f1 to $f_j$, wherein i and j are positive integers and j equals to $2^N$. The amplitude generating unit is connected with the frequency generating unit, and determines and generates an amplitude value Ax of the UWB impulse radio signal having the specific frequency of fi according to the remaining M-N bits binary data; wherein x is a positive integer from 1 to y, y equals to $2^{M-N}$; the amplitude value Ax is selected among a group of amplitude values of the local signal from A1 to Ay. The transmitting sub-module transmits the UWB impulse radio signal having the specific frequency fi and the amplitude value Ax generated by the UWB impulse radio generating sub-module during each unit time period lasting T seconds.

The decoding module comprises a receiving sub-module and a data stream restoring sub-module. The receiving sub-module receives the UWB impulse radio signal having the specific frequency fi and the amplitude value Ax during each unit time period lasting T seconds. The data stream restoring sub-module restores the N-bit binary data of the M-bit binary data stream according to the specific frequency fi of the UWB impulse radio signal and restores the remaining M-N bits binary data of the M-bit binary data stream according to the specific amplitude value Ax of the UWB impulse radio signal, so as to form the M-bit binary data stream during each unit time period lasting T seconds.

Preferably, the frequency generating unit comprises a phase lock loop circuit. Preferably, the amplitude generating unit comprises a power amplifier circuit which performs a $2^{M-N}$-bit amplitude encoding to the input signal according to the M-N bits binary data.

Preferably, the data stream restoring sub-module comprises a low noise amplifier, a mixer, a phase lock loop circuit and an amplitude comparator. The data amplified by the low noise amplifier is frequency decoded by the mixer and finally amplitude decoded by the amplitude comparator, wherein the local frequency of the mixer is generated by the phase loop circuit.

As mentioned above, the high speed transmission encoding/decoding according to the present invention can achieve the improvement of the data rate without increasing circuit complexity, which is useful and attractive to the IR-UWB system.

DETAILED DESCRIPTION OF THE EMBODIMENTS

Reference will now be made in detail to the present preferred embodiments to provide a further understanding of the invention. The specific embodiments and the accompanying drawings discussed are merely illustrative of specific ways to make and use the invention, and do not limit the scope of the invention or the appended claims.

Figure 1:
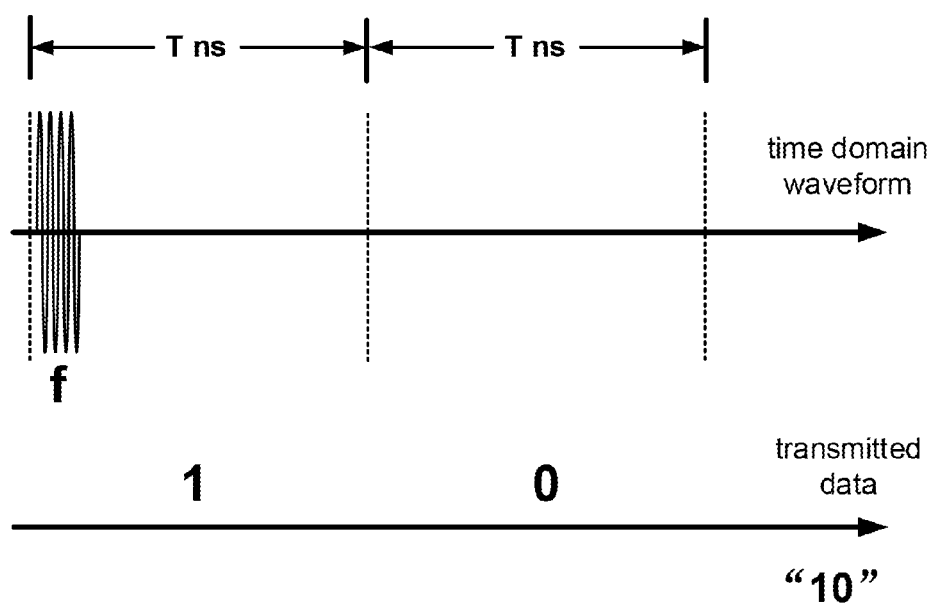
FIG. 1 is a schematic diagram illustrating the conventional data transmission encoding applied in the IR-UWB system.
Figure 2:
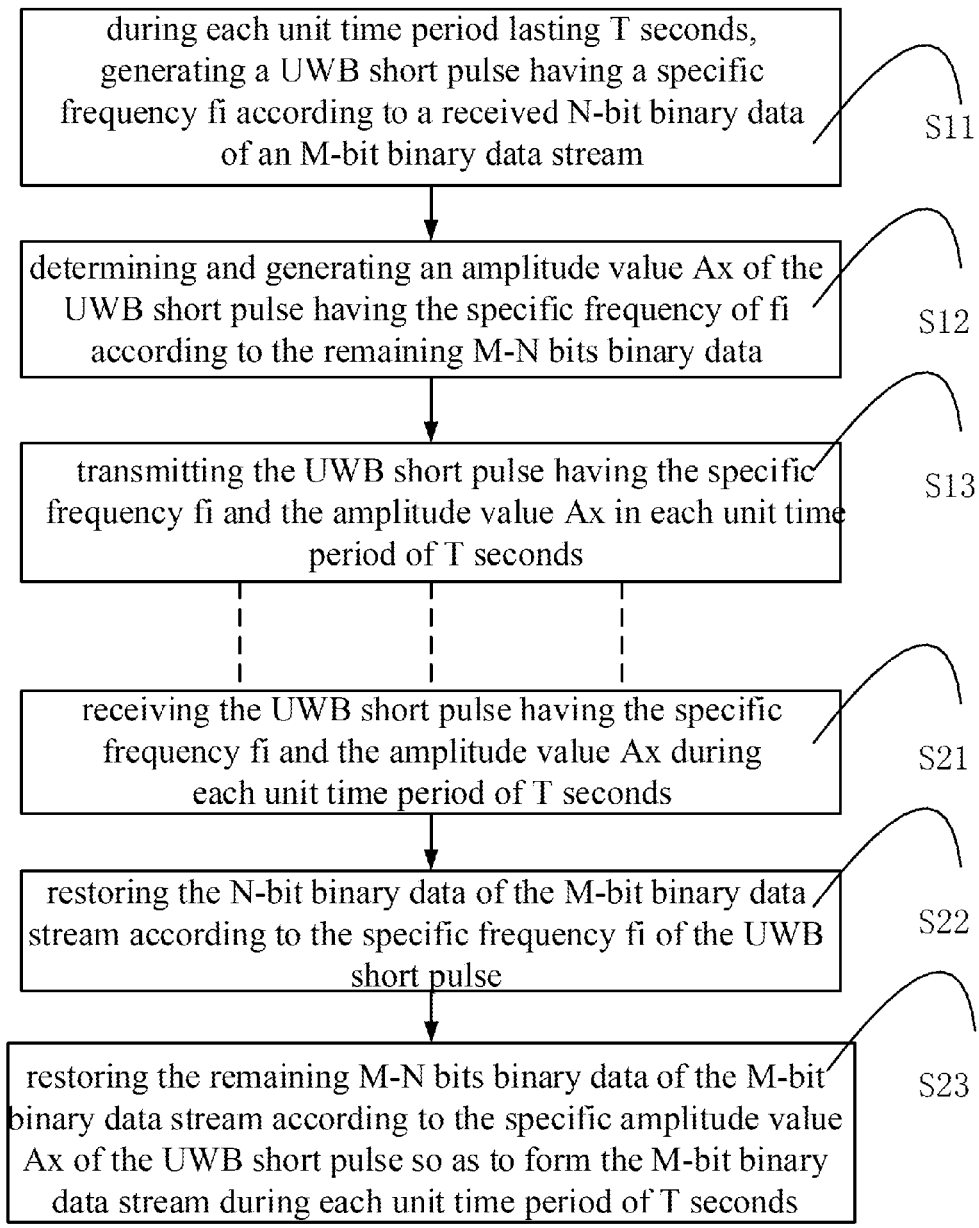
FIG. 2 is a flow chart illustrating the high speed data transmission encoding/decoding method for the IR-UWB system in an embodiment of the present invention.

The high speed data transmission method and data transmission system of the present invention will be described in further details hereinafter with respect to the embodiments and the accompany drawings FIG. 2 to FIG. 6. Those skilled in the art know that UWB protocol features much wider spectrum width (3.1~10.6 GHz), therefore data rate can be maximized if the spectrum width is fully utilized according to the well-known Shannon formula. The present invention can achieve high speed data transmission by transmitting more than 2 bits data per unit time period lasting T seconds. In the embodiments of the data transmission encoding/decoding for the IR-UWB system of the present invention, the data transmission system refers to the IR-UWB system which is applied in the field of wireless transmission and is enabled to transmit high quality image or even video data effectively FIG. 2 is a flow chart illustrating the high speed data transmission encoding/decoding method for the IR-UWB system in a specific embodiment of the present invention. As shown in FIG. 2, the encoding/decoding method comprises an encoding method and a decoding method. The encoding method comprises the following steps:

Step S11: during each unit time period lasting T seconds, receiving an N-bit binary data of an M-bit binary data stream and generating a UWB impulse radio signal having a specific frequency fi; wherein M is a positive integer greater than or equal to 2, N is a positive integer greater than or equal to 1, and M is greater than N; the specific frequency fi is selected among a group of frequencies of a local signal from f1 to fj, wherein i and j are positive integers and j equals to $2^N$;

Step S12: determining and generating an amplitude value Ax of the UWB impulse radio signal having the specific frequency of fi according to the remaining M-N bits binary data; wherein x is a positive integer from 1 to y, y equals to $2^{M-N}$; the amplitude value Ax is selected among a group of amplitude values of the local signal from A1 to Ay;

Step S13: transmitting the UWB impulse radio signal having the specific frequency fi and the amplitude value Ax in each unit time period lasting T seconds;

The decoding method corresponds to the encoding method and comprises the following steps:

Step S21: receiving the UWB impulse radio signal having the specific frequency fi and the amplitude value Ax during each unit time period lasting T seconds;

Step S22: restoring the N-bit binary data of the M-bit binary data stream according to the specific frequency fi of the UWB impulse radio signal;

Step S23: restoring the remaining M-N bits binary data of the M-bit binary data stream according to the specific amplitude value Ax of the UWB impulse radio signal so as to form the M-bit binary data stream during each unit time period lasting T seconds.

It is noted that, the N-bit binary data can be selected from any bits of the M-bit binary data stream. For example, when M is 4 and N is 2, the first bit and the fourth bit of the 4-bit binary data stream can be selected to form the 2-bit binary data to be encoded during data encoding, correspondingly, during data decoding, the decoded 2-bit binary data is restored as the first bit and the fourth bit of the 4-bit binary data stream to be restored. Similarly, the N-bit binary data can be the first N bits of the M-bit binary data stream or the last N bits of the M-bit binary data stream.

In a preferred embodiment of the present invention, M is set to be 4 and N is set to be 2, thus j and y are both 4, which means that a 4-bit data can be transmitted in each unit time period lasting T seconds. The 4-bit data is consisted of a first 2-bit data and a last 2-bit data.

Figure 3:
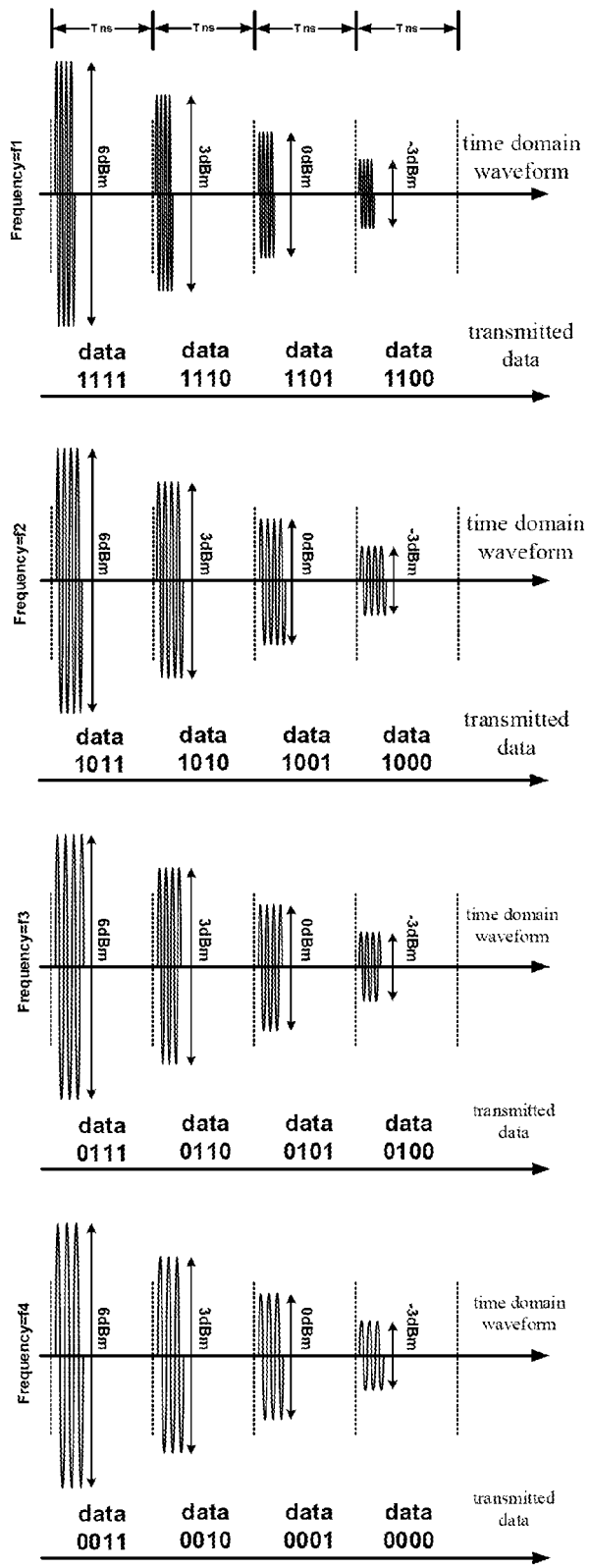
FIG. 3 is a schematic diagram illustrating the data transmission encoding for the IR-UWB system in an embodiment of the present invention.

FIG. 3 is a schematic diagram illustrating the data transmission encoding for the IR-UWB system in an embodiment of the present invention. Referring to FIG. 3, for the first 2-bit data to be encoded, in order to further enhance the data rate without increasing the system complexity, the frequency of the impulse radio signal transmitted per unit time period lasting T seconds can be set as four different frequencies of f1=5.5 GHz, f2=4.9 GHz, f3=4.3 GHz and f4=3.7 GHz. The data transmission of the present invention is provided as follows: if an impulse radio signal having the frequency of f1 is transmitted in the unit time period, binary data 11 is transferred at the same time; if an impulse radio signal having the frequency of f2 is transmitted in the unit time period, binary data 10 is transferred at the same time; if an impulse radio signal having the frequency of f3 is transmitted in the unit time period, binary data 01 is transferred at the same time; and if an impulse radio signal having the frequency of f4 is transmitted in the unit time period, binary data 00 is transferred at the same time.

For the last 2-bit data to be encoded, in order to further enhance the data rate without increasing the system complexity, the amplitude value of the impulse radio signal transmitted per unit time period lasting T seconds can be set as four different amplitude values Ax of A1=6 dBm, A2=3 dBm, A3=0 dBm and A4=−3 dBm.

The encoding scheme mentioned above determines the data transmission as follows: if an impulse radio signal having the amplitude value of A1 is transmitted, it means that the binary data transferred during the unit time period is 11; if an impulse radio signal having the amplitude value of A2 is transmitted, it means that the binary data transferred during the unit time period is 10; if an impulse radio signal having the amplitude value of A3 is transmitted, it means that the binary data transferred during the unit time period is 01; and if an impulse radio signal having the amplitude value of A4 is transmitted, it means that the binary data transferred during the unit time period is 00.

In accordance with the first 2-bit encoding and last 2-bit encoding, a 4-bit data can be transferred in each unit time period lasting T seconds. The 4-bit data is encoded as follows:

when data "1111" is transmitted, it is encoded to be an impulse radio signal in the time domain having a frequency of f1=5.5 GHz and an amplitude value of A1=6 dBm during the unit time period; when data "1110" is transmitted, it is encoded to be an impulse radio signal in the time domain having a frequency of f1=5.5 GHz and an amplitude value of A2=3 dBm during the unit time period;

when data "1101" is transmitted, it is encoded to be an impulse radio signal in the time domain having a frequency of f1=5.5 GHz and an amplitude value of A3=0 dBm during the unit time period;

when data "1100" is transmitted, it is encoded to be an impulse radio signal in the time domain having a frequency of f1=5.5 GHz and an amplitude value of A4=−3 dBm during the unit time period;

when data "1011" is transmitted, it is encoded to be an impulse radio signal in the time domain having a frequency of f2=4.9 GHz and an amplitude value of A1=6 dBm during the unit time period;

when data "1010" is transmitted, it is encoded to be an impulse radio signal in the time domain having a frequency of f2=4.9 GHz and an amplitude value of A2=3 dBm during the unit time period;

when data "1001" is transmitted, it is encoded to be an impulse radio signal in the time domain having a frequency of f2=4.9 GHz and an amplitude value of A3=0 dBm during the unit time period;

when data "1000" is transmitted, it is encoded to be an impulse radio signal in the time domain having a frequency of f2=4.9 GHz and an amplitude value of A4=−3 dBm during the unit time period;

when data "0111" is transmitted, it is encoded to be an impulse radio signal in the time domain having a frequency of f3=4.3 GHz and an amplitude value of A1=6 dBm during the unit time period;

when data "0110" is transmitted, it is encoded to be an impulse radio signal in the time domain having a frequency of f3=4.3 GHz and an amplitude value of A2=3 dBm during the unit time period;

when data "0101" is transmitted, it is encoded to be an impulse radio signal in the time domain having a frequency of f3=4.3 GHz and an amplitude value of A3=0 dBm during the unit time period;

when data "0100" is transmitted, it is encoded to be an impulse radio signal in the time domain having a frequency of f3=4.3 GHz and an amplitude value of A4=−3 dBm during the unit time period;

when data "0011" is transmitted, it is encoded to be an impulse radio signal in the time domain having a frequency of f4=3.7 GHz and an amplitude value of A1=6 dBm during the unit time period;

when data "0010" is transmitted, it is encoded to be an impulse radio signal in the time domain having a frequency of f4=3.7 GHz and an amplitude value of A2=3 dBm during the unit time period;

when data "0001" is transmitted, it is encoded to be an impulse radio signal in the time domain having a frequency of f4=3.7 GHz and an amplitude value of A3=0 dBm during the unit time period;

when data "0000" is transmitted, it is encoded to be an impulse radio signal in the time domain having a frequency of f4=3.7 GHz and an amplitude value of A4=−3 dBm during the unit time period.

Figure 4:
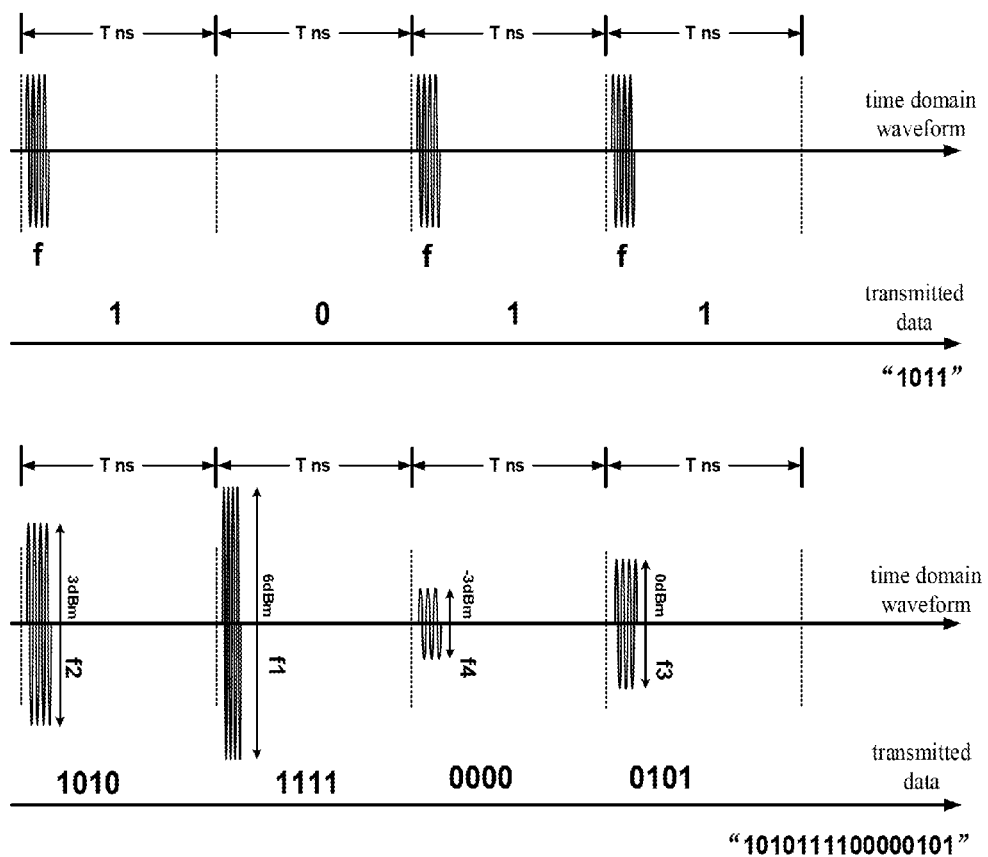
FIG. 4 is a comparison diagram illustrating the data stream transmitted by the conventional data transmission encoding and that transmitted by the high speed data transmission encoding in an embodiment of the present invention.

FIG. 4 is a comparison diagram illustrating the data stream transmitted by the conventional data transmission encoding and that transmitted by the high speed data transmission encoding in an embodiment of the present invention It is assumed that in each of the two data transmission ways illustrated in FIG. 4, data is transmitted in 4 unit time periods.

Firstly, please referring to the conventional data transmission encoding, it is assumed that the unit time period T=1 us, then if the impulse radio signal transmitted in the unit time period has only one frequency, the data rate of the whole impulse radio system will be 1 MHz. As shown in FIG. 4, there exists one impulse radio signal in the first unit time period and thus data 1 is transmitted; there exists no impulse radio signals in the second unit time period and thus data 0 is transmitted; there exists one impulse radio signal in the third unit time period and thus data 1 is transmitted; there exists one impulse radio signal in the fourth unit time period and thus data 1 is transmitted. Consequently, during the four unit time periods (4 us), data stream "1011" is transmitted. The data rate of the conventional data transmission encoding is 1 MHz.

Referring to the high speed data transmission encoding of the present invention, the unit time period is also assumed to be T=1 us. As shown in FIG. 4, there exists an impulse radio signal having a frequency of f2=4.9 GHz and an amplitude value of A2=3 dBm in the first unit time period and thus data 1010 is transmitted; there exists an impulse radio signal having a frequency of f1=5.5 GHz and an amplitude value of A1=6 dBm in the second unit time period and thus data 1111 is transmitted; there exists an impulse radio signal having a frequency of f4=3.7 GHz and an amplitude value of A4=−3 dBm in the third unit time period and thus data 0000 is transmitted; there exists an impulse radio signal having a frequency of f3=4.3 GHz and an amplitude value of A3=0 dBm in the fourth unit time period and thus data 0101 is transmitted. Consequently, during the four unit time periods (4 us), data stream "1010111100000101" is transmitted. The data rate of the high speed data transmission encoding of the present invention is 4 MHz.

Therefore, compared with the conventional data transmission encoding in which impulse radio signal having one specific frequency is transmitted in each unit time period T (the data rate is 1/T HZ), the high speed data transmission encoding can quadruple the conventional data rate of 1/T HZ to be 4/T HZ, which remarkably enhances the data transmission efficiency.

Figure 5:
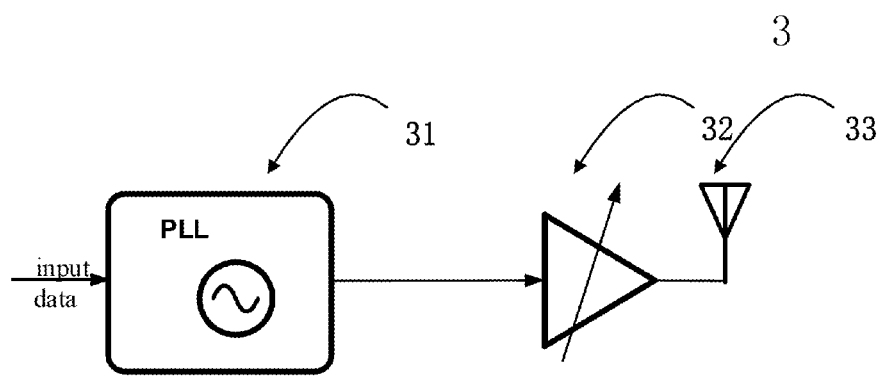
FIG. 5 is a circuit diagram illustrating the transmitter of the IR-UWB system having the encoding module of the present invention.

The high speed data transmission encoding/decoding method mentioned above can be realized by an encoding module and a decoding module. FIG. 5 is a circuit diagram illustrating the transmitter of the IR-UWB system having the encoding module of the present invention. As shown in FIG. 5, the encoding module 3 comprises a UWB impulse radio generating sub-module and a transmitting sub-module 33. The UWB impulse radio generating sub-module comprises a frequency generating unit 31 and an amplitude generating unit 32. The frequency generating unit generates a UWB impulse radio signal having a specific frequency fi during each unit time period lasting T seconds according to a received N-bit binary data of an M-bit binary data stream; wherein M is a positive integer greater than or equal to 2, N is a positive integer greater than or equal to 1, and M is greater than N; the specific frequency fi is selected among a group of frequencies of a local signal from f1 to fj, wherein i and j are positive integers and j equals to $2^N$.

The amplitude generating unit 32 is connected with the frequency generating unit 31, and determines and generates an amplitude value Ax of the UWB impulse radio signal having the specific frequency of fi according to the remaining M-N bits binary data; wherein x is a positive integer from 1 to y, y equals to $2^{M-N}$; the amplitude value Ax is selected among a group of amplitude values of the local signal from A1 to Ay.

The transmitting sub-module 33 transmits the UWB impulse radio signal having the specific frequency fi and the amplitude value Ax generated by the UWB impulse radio generating sub-module during each unit time period lasting T seconds.

Please referring to FIG. 5, specifically, in the embodiment, the frequency generating unit 31 is a phase lock loop circuit (PLL circuit), the amplitude generating unit 32 is a power amplifier circuit. The PLL circuit receives the input data signal, produces the specific frequency fi selected among the frequencies f1, f2, f3 and f4 of the local signal, performs first two-bit frequency encoding to the input data signal and then outputs the frequency encoded signal to the power amplifier circuit. The power amplifier circuit produces the specific amplitude value Ax selected among the amplitudes A1 to A4 of the local signal and performs last 2-bit amplitude encoding to the signal transferred from the PLL circuit and finally transmits the encoded signal through the transmitting sub-module 33 such as an antenna.

Figure 6:
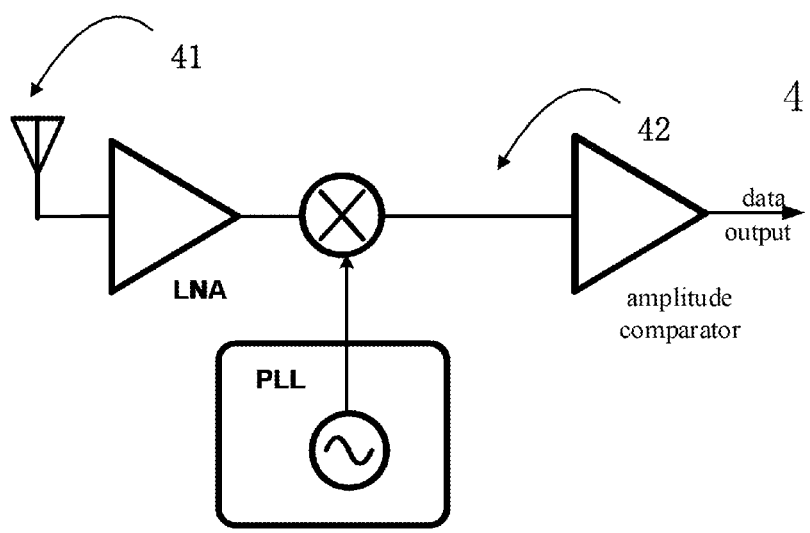
FIG. 6 is a circuit diagram illustrating the receiver of the IR-UWB system having the decoding module of the present invention.

FIG. 6 is a circuit diagram illustrating the receiver of the IR-UWB system having the decoding module of the present invention. As shown in FIG. 6, the decoding module 4 comprises a receiving sub-module 41 and a data stream restoring sub-module 42. The receiving sub-module 41 receives the UWB impulse radio signal having the specific frequency fi and the amplitude value Ax during each unit time period lasting T seconds. The data stream restoring sub-module 42 restores the N-bit binary data of the M-bit binary data stream according to the specific frequency fi of the UWB impulse radio signal and restoring the remaining M-N bits binary data of the M-bit binary data stream according to the specific amplitude value Ax of the UWB impulse radio signal, so as to form the M-bit binary data stream during each unit time period lasting T seconds.

In the embodiment, the receiving sub-module 41 is an antenna, the data stream restoring sub-module 42 comprises a low noise amplifier (LNA), a mixer, a phase lock loop circuit (PLL circuit) and an amplitude comparator. The operation of the decoding module will be described with the following example in which M is set to be 4 and N is set to be 2.

Specifically, the signal received by the antenna is firstly amplified by the LNA and then transferred to the mixer for frequency decoding. The local frequency of the mixer is generated by the PLL circuit. The PLL circuit generates the local frequencies of f1, f2 f3 and f4 so as to distinguish signals having different frequencies and performs 2-bit frequency decoding and further outputs the signal with mixed frequencies and the decoded two-bit binary data to the amplitude comparator. The amplitude comparator compares and distinguishes the amplitude value of the received signal as 6 dBm, 3 dBm, 0 dBm or −3 dBm and performs 2-bit amplitude decoding to generate another two-bit binary data. Finally, the actual four-bit digital signal can be transmitted correctly via frequency decoding and amplitude decoding.

In conclusion, the high speed transmission encoding/decoding according to the present invention can quadruple the data rate without increasing circuit complexity, which is useful and attractive to the IR-UWB system.

Although the present invention has been disclosed as above with respect to the preferred embodiments, they should not be construed as limitations to the present invention. Various modifications and variations can be made by the ordinary skilled in the art without departing the spirit and scope of the present invention. Therefore, the protection scope of the present invention should be defined by the appended claims.

The invention claimed is:

1. An IR-UWB data transmission encoding/decoding method, wherein the encoding method comprises the following steps:
   Step S11: during each unit time period lasting T seconds, receiving an N-bit binary data of an M-bit binary data stream and generating a UWB impulse radio signal having a specific frequency fi; wherein M is a positive integer greater than or equal to 2, N is a positive integer greater than or equal to 1, and M is greater than N; the specific frequency fi is selected among a group of frequencies of a local signal from f1 to fj, wherein i and j are positive integers and j equals to $2^N$;
   Step S12: determining and generating an amplitude value Ax of the UWB impulse radio signal having the specific frequency of fi according to the remaining M-N bits binary data; wherein x is a positive integer from 1 to y, y equals to $2_{M-N}$; the amplitude value Ax is selected among a group of amplitude values of the local signal from A1 to Ay;
   Step S13: transmitting the UWB impulse radio signal having the specific frequency fi and the amplitude value Ax in each unit time period lasting T seconds;
   wherein the decoding method corresponds to the encoding method and comprises the following steps:
   Step S21: receiving the UWB impulse radio signal having the specific frequency fi and the amplitude value Ax during each unit time period lasting T seconds;
   Step S22: restoring the N-bit binary data of the M-bit binary data stream according to the specific frequency fi of the UWB impulse radio signal;
   Step S23: restoring the remaining M-N bits binary data of the M-bit binary data stream according to the specific amplitude value Ax of the UWB impulse radio signal so as to form the M-bit binary data stream during each unit time period lasting T seconds.

2. The IR-UWB data transmission encoding/decoding method according to claim 1, wherein the N-bit binary data is the first N-bit binary data of the M-bit binary data stream.

3. The IR-UWB data transmission encoding/decoding method according to claim 1, wherein the N-bit binary data is the last N-bit binary data of the M-bit binary data stream.

4. The IR-UWB data transmission encoding/decoding method according to claim 1, wherein M is 4 and N is 2; the group of frequencies of the local signal includes f1, f2, f3 and f4; the group of the amplitude values of the local signal includes A1, A2, A3 and A4.

5. The IR-UWB data transmission encoding/decoding method according to claim 4, wherein the specific frequency of the UWB impulse radio signal is selected to be f1=5.5 GHz, f2=4.9 GHz, f3=4.3 GHz or f4=3.7 GHz.

6. The IR-UWB data transmission encoding/decoding method according to claim 4, wherein the specific amplitude of the UWB impulse radio signal is selected to be A1=6 dBm, A2=3 dBm, A3=0 dBm or A4=−3 dBm.

7. An IR-UWB data transmission encoding/decoding module comprising en encoding module and a decoding module, wherein the encoding module comprises:
   a UWB impulse radio generating sub-module comprising:
      a frequency generating unit which generates a UWB impulse radio signal having a specific frequency fi during each unit time period lasting T seconds according to a received N-bit binary data of an M-bit binary data stream; wherein M is a positive integer greater than or equal to 2, N is a positive integer greater than or equal to 1, and M is greater than N; the specific frequency fi is selected among a group of frequencies of a local signal from f1 to fj, wherein i and j are positive integers and j equals to $2^N$;
      an amplitude generating unit connected with the frequency generating unit which determines and generates an amplitude value Ax of the UWB impulse radio signal having the specific frequency of fi according to the remaining M-N bits binary data; wherein x is a positive integer from 1 to y, y equals to $2^{M-N}$;
   a transmitting sub-module which transmits the UWB impulse radio signal having the specific frequency fi and the amplitude value Ax generated by the UWB impulse radio generating sub-module during each unit time period lasting T seconds;
   the decoding module comprises:
   a receiving sub-module which receives the UWB impulse radio signal having the specific frequency fi and the amplitude value Ax during each unit time period lasting T seconds;
   a data stream restoring sub-module which restores the N-bit binary data of the M-bit binary data stream according to the specific frequency fi of the UWB impulse radio signal and restores the remaining M-N bits binary data of the M-bit binary data stream according to the specific amplitude value Ax of the UWB impulse radio signal, so as to form the M-bit binary data stream during each unit time period lasting T seconds.

8. The IR-UWB data transmission encoding/decoding module according to claim 7, wherein the frequency generating unit comprises a phase lock loop circuit.

9. The IR-UWB data transmission encoding/decoding module according to claim 7, wherein the amplitude generating unit comprises a power amplifier circuit which performs a $2^{M-N}$-bit amplitude encoding to the input signal according to the M-N bits binary data.

10. The IR-UWB data transmission encoding/decoding module according to claim 7, wherein the data stream restoring sub-module comprises a low noise amplifier, a mixer, a phase lock loop circuit and an amplitude comparator, the signal amplified by the low noise amplifier is transmitted to the mixer for frequency decoding and then transmitted to the amplitude comparator for amplitude decoding; wherein the local frequency of the mixer is generated by the phase loop circuit.

11. The IR-UWB data transmission encoding/decoding method according to claim 2, wherein M is 4 and N is 2; the group of frequencies of the local signal includes f1, f2, f3 and f4; the group of the amplitude values of the local signal includes A1, A2, A3 and A4.

12. The IR-UWB data transmission encoding/decoding method according to claim 11, wherein the specific frequency of the UWB impulse radio signal is selected to be f1=5.5 GHz, f2=4.9 GHz, f3=4.3 GHz or f4=3.7 GHz.

13. The IR-UWB data transmission encoding/decoding method according to claim 11, wherein the specific amplitude of the UWB impulse radio signal is selected to be A1=6 dBm, A2=3 dBm, A3=0 dBm or A4=−3 dBm.

14. The IR-UWB data transmission encoding/decoding method according to claim 3, wherein M is 4 and N is 2; the group of frequencies of the local signal includes f1, f2, f3 and f4; the group of the amplitude values of the local signal includes A1, A2, A3 and A4.

15. The IR-UWB data transmission encoding/decoding method according to claim 14, wherein the specific frequency of the UWB impulse radio signal is selected to be f1=5.5 GHz, f2=4.9 GHz, f3=4.3 GHz or f4=3.7 GHz.

16. The IR-UWB data transmission encoding/decoding method according to claim 14, wherein the specific amplitude of the UWB impulse radio signal is selected to be A1=6 dBm, A2=3 dBm, A3=0 dBm or A4=−3 dBm.

* * * * *